United States Patent Office 2,987,446
Patented June 6, 1961

2,987,446
COSMETIC CREAM
Kurt Riethmüller, Fohlenkamp 7, Gevelsberg, Westphalia, Germany
No Drawing, Filed Apr. 18, 1956, Ser. No. 578,889
Claims priority, application Germany Apr. 29, 1955
2 Claims. (Cl. 167—91)

This invention relates to a cosmetic cream which combines in one preparation the properties required of a shaving cream, hair cream, toothpaste, make-up removing cream, cleansing cream, skin cream and sunburn preventing cream.

The said required properties are: for a shaving cream, lather formation, softening and raising of the beard hairs, for a hair cream capacity for fixing the hair and giving it a pleasing softness, for a toothpaste foam formation, astringency and disinfectant and deodorizing effect.

These properties are obtained in accordance with the invention by providing a preparation consisting of an oil-in-water emulsion, based on fatty alcohols, containing as lubricant oleic acid oleyl ester and as emulsifier small quantities of fatty alcohol sulphonates together with the further ingredients *Oleum hyperici,* urea and citric acid. The oleic acid oleyl ester also imparts to the cream foaming and cleansing properties while the addition of *Oleum hyperici* and urea has a styptic and inflammation reducing effect. By the addition of citric acid astringent and disinfecting properties are imparted to the cream.

The following has been proved to be a particularly suitable composition of the multi-purpose cream:

| | Percent |
|---|---|
| Cetyl or stearyl alcohol or a mixture thereof | 2 to 3 |
| Fatty alcohol sulphonate | 0.2 to 0.4 |
| Water | 70 to 80 |
| Oleic acid oleyl ester | 7 to 9 |
| *Oleum hyperici* | 2 to 3 |
| Urea | 1 to 2 |
| Citric acid | 0.2 to 0.4 |

Further additions, such as 3 to 5% of glycerine and perfumes such as an aromatic or essential oil or Eau-de-cologne oil in amounts of 0.01 to 0.03% have been found to be particularly suitable.

I claim:
1. A cream for use as a shaving cream, tooth paste, skin and hair treating cream and sunburn preventive consisting of a dispersion having an aqueous continuous phase and comprising 2 to 3% of a fatty alcohol component selected from the group consisting of cetyl alcohol, stearyl alcohol and mixtures thereof, 0.2 to 0.4% of fatty alcohol sulphonate as an emulsifier, 7 to 9% oleic acid oleyl ester as an active lubricant, 70 to 80% water, 2 to 3% *Oleum hyperici,* 1 to 2% urea, and 0.2 to 0.4% citric acid.

2. A cream for use as a shaving cream, tooth paste, skin and hair treating cream and sunburn preventive consisting of a dispersion having an aqueous continuous phase and comprising a fatty alcohol component selected from the group consisting of cetyl alcohol, stearyl alcohol and mixtures thereof, fatty alcohol sulphonate as an emulsifier, oleic acid oleyl ester as an active lubricant, water, *Oleum hyperici,* urea, and citric acid.

References Cited in the file of this patent

UNITED STATES PATENTS 2,586,288   Apperson _____ Feb. 19, 1952

OTHER REFERENCES

King: American Dispensatory, 8th ed. Cincinnati, 1870, pages 437–438.

Cosmetic Materials, Leonard Hill Ltd., London, 1950, page 311.

Thomssen: Mod. Cos., Drug and Cos. Ind., N.Y., 3rd ed., 1947, pp. 192–195, 398.

Drug and Cosmetic Ind., 64:6, June 1949, pp. 696, 697.

Warth: The Chem. and Tech. of Waxes, Reinhold Pub. Co., New York, 2nd ed., 1956, pp. 143, 144.